United States Patent
Jo

(10) Patent No.: US 11,892,607 B2
(45) Date of Patent: *Feb. 6, 2024

(54) OPTICAL SYSTEM

(71) Applicant: SAMSUNG ELECTRO-MECHANICS CO., LTD., Suwon-si (KR)

(72) Inventor: Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,140

(22) Filed: Jan. 4, 2022

(65) Prior Publication Data

US 2022/0128801 A1 Apr. 28, 2022

Related U.S. Application Data

(63) Continuation of application No. 16/435,730, filed on Jun. 10, 2019, now Pat. No. 11,249,284, which is a (Continued)

(30) Foreign Application Priority Data

Oct. 20, 2014 (KR) .................. 10-2014-0142082

(51) Int. Cl.
*G02B 3/02* (2006.01)
*G02B 21/02* (2006.01)
(Continued)

(52) U.S. Cl.
CPC ......... *G02B 13/0045* (2013.01); *H04N 23/54* (2023.01)

(58) Field of Classification Search
CPC ........ G02B 13/00; G02B 13/04; G02B 13/18; G02B 21/02
(Continued)

(56) References Cited

U.S. PATENT DOCUMENTS 4,139,264 A 2/1979 Takahashi
8,385,006 B2 2/2013 Tsai et al.
(Continued)

FOREIGN PATENT DOCUMENTS

CN 202067015 U 12/2011
CN 203606554 U 5/2014
(Continued)

OTHER PUBLICATIONS

Korean Office Action dated Jun. 27, 2022, in counterpart Korean Patent Application No. 10-2022-0031591 (5 pages in English and 4 pages in Korean).
(Continued)

*Primary Examiner* — Dawayne Pinkney
(74) *Attorney, Agent, or Firm* — NSIP Law

(57) ABSTRACT

An optical system includes: a first lens having refractive power; a second lens having refractive power; a third lens having refractive power and comprising an image-side surface which is convex in a paraxial region; a fourth lens having refractive power; a fifth lens having refractive power and comprising an image-side surface which is concave in the paraxial region; a sixth lens having refractive power; and a stop disposed in front of an object-side surface of the first lens. The first to sixth lenses are sequentially disposed from an object side. A radius of the stop SD and an overall focal length of the optical system f satisfy: 0.2<SD/f<0.6. An aberration improvement effect and high degrees of resolution and brightness may be obtained.

12 Claims, 17 Drawing Sheets

Related U.S. Application Data continuation of application No. 14/670,103, filed on Mar. 26, 2015, now Pat. No. 10,365,455.

(51) Int. Cl.
| | |
|---|---|
| *G02B 13/04* | (2006.01) |
| *G02B 9/62* | (2006.01) |
| *G02B 13/00* | (2006.01) |
| *H04N 23/54* | (2023.01) |

(58) Field of Classification Search
USPC .............. 359/756–757, 752, 713, 658, 708
See application file for complete search history.

(56) References Cited

U.S. PATENT DOCUMENTS

| | | |
|---|---|---|
| 9,307,130 B2 | 4/2016 | Chen et al. |
| 9,435,983 B2 | 9/2016 | Liao et al. |
| 2012/0243108 A1 | 9/2012 | Tsai et al. |
| 2013/0335833 A1 | 12/2013 | Liao et al. |
| 2014/0063616 A1 | 3/2014 | Okano et al. |
| 2014/0071543 A1 | 3/2014 | Shinohara |
| 2014/0111876 A1 | 4/2014 | Tang et al. |
| 2014/0192422 A1 | 7/2014 | Tang et al. |
| 2014/0218582 A1 | 8/2014 | Chen et al. |
| 2014/0254029 A1 | 9/2014 | Hsu et al. |
| 2014/0320981 A1 | 10/2014 | Hsieh et al. |
| 2015/0042862 A1 | 2/2015 | Huang |
| 2015/0138431 A1* | 5/2015 | Shin .................... G02B 9/62 |
| | | 359/757 |
| 2015/0160436 A1 | 6/2015 | Chen et al. |
| 2015/0192760 A1 | 7/2015 | Huang |
| 2015/0253540 A1 | 9/2015 | Hsu et al. |
| 2015/0260954 A1 | 9/2015 | Ota et al. |
| 2015/0338607 A1 | 11/2015 | Liao et al. |
| 2015/0339607 A1 | 11/2015 | Nielsen et al. |

FOREIGN PATENT DOCUMENTS

| | | |
|---|---|---|
| CN | 103913821 A | 7/2014 |
| CN | 103969792 A | 8/2014 |
| CN | 103984084 A | 8/2014 |
| CN | 104035186 A | 9/2014 |
| JP | 2007-293141 A | 11/2007 |
| JP | 2013-88632 A | 5/2013 |
| KR | 10-2009-0131805 A | 12/2009 |
| KR | 10-2010-0001525 A | 1/2010 |
| TW | 201333518 A1 | 8/2013 |
| TW | 201348735 A | 12/2013 |
| TW | 201435383 A | 9/2014 |
| TW | 201437674 A | 10/2014 |

OTHER PUBLICATIONS

Korean Office Action dated Nov. 20, 2018 in corresponding Korean Patent Application No. 10-2014-0142082 (10 pages in English, 9 pages in Korean).
Chinese Office Action dated Nov. 29, 2018 in corresponding Chinese Patent Application No. 201510257223.0 (13 pages in English, 8 pages in Chinese).
Taiwanese Office Action dated Apr. 2, 2019 in corresponding Taiwanese Patent Application No. 107138897 (6 pages in English, 5 pages in Taiwanese).
Korean Office Action dated Jul. 6, 2020 in the related Korean Patent Application No. 10-2020-0070941 (6 pages in English and 4 pages in Korean).
Korean Office Action dated Jun. 28, 2021 in counterpart Korean Patent Application No. 10-2021-0053781 (12 pages in English and 6 pages in Korean).
Chinese Office Action dated Aug. 26, 2021 issued in counterpart Chinese Patent Application No. 202010545334.2 (6 pages in English and 8 pages in Chinese).
Chinese Office Action dated Feb. 17, 2022 in corresponding Chinese Patent Application No. 202010545334.2. (3 pages in English and 5 pages in Chinese).

* cited by examiner

| Surface | Radius | Thickness | index | abbe |
|---|---|---|---|---|
| object | Infinity | Infinity | | |
| Stop | Infinity | -0.2 | | |
| 1 | 1.75297 | 0.933159 | 1.544 | 56 |
| 2 | -11.60468 | 0.04 | | |
| 3 | 10.77031 | 0.26 | 1.65 | 21.5 |
| 4 | 2.60444 | 0.277373 | | |
| 5 | -415.90995 | 0.467597 | 1.544 | 56 |
| 6 | -15.19837 | 0.332274 | | |
| 7 | -3.53069 | 0.35 | 1.65 | 21.5 |
| 8 | -3.64307 | 0.11715 | | |
| 9 | -109.29655 | 0.413218 | 1.65 | 21.5 |
| 10 | 8.78381 | 0.105132 | | |
| 11 | 1.57574 | 0.77363 | 1.544 | 56 |
| 12 | 1.42813 | 0.280467 | | |
| 13 | Infinity | 0.11 | | |
| 14 | Infinity | 0.63746 | | |
| Image | Infinity | 0.003527 | | |

FIG. 3

| Surface # | 1 | 2 | 3 | 4 | 5 | 6 | 7 | 8 | 9 | 10 | 11 | 12 |
|---|---|---|---|---|---|---|---|---|---|---|---|---|
| Conic Constant (K) | -0.449842 | -11.253646 | -12.4411 | 4.467357 | -1.000001 | 8.349532 | 5.179262 | -28.223618 | 62.298376 | 18.764781 | -6.388467 | -0.889233 |
| 4th Order Coefficient (A) | 0.000539503 | 0.003685994 | 0.002271654 | -0.005385906 | -0.005145721 | -0.008913801 | -0.203223 | -0.327808 | 0.109348 | 0.005731281 | -0.164914 | -0.244465 |
| 6th Order Coefficient (B) | 0.0015636638 | -0.001398011 | 0.007373381 | 0.111384 | 0.008367381 | 0.007573 | 0.488522 | 0.347514 | -0.100119 | -0.026288924 | 0.051196363 | 0.096893 |
| 8th Order Coefficient (C) | -0.001343271 | -0.001440072 | -0.159488 | -0.171173 | -0.002897971 | -0.102557 | -0.421389 | -0.622282 | 0.014485381 | 0.001773041 | -0.007319022 | -0.0352347 |
| 10th Order Coefficient (D) | 0.000918041 | 0.00277328 | 0.127877 | 0.185651 | 0.016680071 | 0.085712 | 0.286914 | 0.456176 | 0.006872671 | -0.002210971 | 0.000538023 | 0.00091383 |
| 12th Order Coefficient (E) | 0.000941753 | -0.001882946 | -0.034712381 | -0.127380901 | -0.004753981 | -0.007562781 | -0.103621 | -0.103593 | -0.002828801 | 3.901108E-06 | -3.065631-05 | -0.00154846 |
| 14th Order Coefficient (F) | 0.005318167 | 0.002271445 | -0.001711351 | 0.036825731 | 0.000576381 | 0.0043281 | 0.011760331 | 0.0459283 | 0.000347831 | 6.552335-06 | -1.134821-07 | 0.00015723 |
| 16th Order Coefficient (G) | -0.003329081 | -0.001441131 | 0.001441531 | -0.005144211 | -0.000823491 | -0.001303201 | -0.000631821 | -0.005863681 | -3.035211-05 | -7.472441-07 | 2.233631-08 | -8.864096-06 |
| 18th Order Coefficient (H) | 0 | 0 | 0 | 0 | 0 | 0 | 0 | 0.000161234 | 7.393641-07 | 2.008045-08 | -3.857711-10 | 1.982671-07 |

FIG. 4

| Surface | Radius | Thickness | index | abbe |
|---|---|---|---|---|
| object | Infinity | Infinity | | |
| Stop | Infinity | 0 | | |
| 1 | 1.54386 | 0.756625 | 1.544 | 56 |
| 2 | 7.36676 | 0.069536 | | |
| 3 | 6.09854 | 0.348308 | 1.65 | 21.5 |
| 4 | 2.60963 | 0.363295 | | |
| 5 | 385.18367 | 0.363145 | 1.544 | 56 |
| 6 | -19.14258 | 0.478409 | | |
| 7 | -3.63695 | 0.25534 | 1.65 | 21.5 |
| 8 | -3.44257 | 0.138881 | | |
| 9 | 80.18601 | 0.532001 | 1.65 | 21.5 |
| 10 | 7.65282 | 0.139073 | | |
| 11 | 1.49851 | 0.50298 | 1.544 | 56 |
| 12 | 1.32355 | 0.166645 | | |
| 13 | Infinity | 0.243377 | | |
| 14 | Infinity | 0.885705 | | |
| Image | Infinity | 0.004178 | | |

| Surface | Radius | Thickness | index | abbe |
|---|---|---|---|---|
| object | Infinity | Infinity | | |
| Stop | Infinity | -0.3 | | |
| 1 | 1.76795 | 0.869339 | 1.544 | 56 |
| 2 | -67.63849 | 0.057665 | | |
| 3 | 7.5392 | 0.274915 | 1.65 | 21.5 |
| 4 | 2.4705 | 0.344471 | | |
| 5 | 21.12793 | 0.43835 | 1.544 | 56 |
| 6 | -20.59732 | 0.370079 | | |
| 7 | -3.25122 | 0.435976 | 1.65 | 21.5 |
| 8 | -3.04163 | 0.040056 | | |
| 9 | -150 | 0.475626 | 1.65 | 21.5 |
| 10 | 10.59998 | 0.12528 | | |
| 11 | 1.55878 | 0.756757 | 1.544 | 56 |
| 12 | 1.33639 | 0.271132 | | |
| 13 | Infinity | 0.11 | | |
| 14 | Infinity | 0.69278 | | |
| Image | Infinity | 0.019719 | | |

FIG. 11

| surface # | 1 | 2 | 3 | 4 | 5 | 6 | 7 | 8 | 9 | 10 | 11 | 12 |
|---|---|---|---|---|---|---|---|---|---|---|---|---|
| Conic Constant (K) | -0.25575 | -11.353846 | -12.441134 | 3.88217 | -1 | 0.340523 | 5.240624 | 28.272139 | 62.250371 | -19.763484 | 5.020816 | -0.872361 |
| 4th Order Coefficient (A) | -0.0030234 | -0.04521 | -0.0853236 | -0.0893647 | -0.0861022 | -0.102286 | 0.221915 | -0.136617 | 0.124631 | -0.0328242 | -0.72215 | -0.265438 |
| 6th Order Coefficient (B) | 0.0038615 | 0.133028 | 0.227813 | 0.114413 | 0.027803 | 0.097239 | 0.361807 | 0.577652 | -0.108116 | -0.002641446 | 0.0853836 | 0.121183 |
| 8th Order Coefficient (C) | -0.0108194 | -0.180345 | -0.253481 | 0.0118967 | -0.0370853 | -0.162109 | -0.0334772 | -0.639115 | 0.00213874 | -0.03015205 | -0.0163516 | -0.0463923 |
| 10th Order Coefficient (D) | 0.175881 | 0.094939 | 0.102271 | -0.285417 | 0.021223 | 0.193752 | 0.215331 | 0.456281 | -0.08209998 | 0.00341481 | 0.00118921 | 0.0174328 |
| 12th Order Coefficient (E) | -0.162656 | -0.022947 | 0.00351465 | 0.427041 | -0.00961284 | -0.148588 | -0.0745034 | -0.190208 | 0.00854684 | -0.0038723 | -0.00013539 | -0.00215333 |
| 14th Order Coefficient (F) | 0.077619 | 0.000319847 | -0.011863 | -0.380097 | 0.000651777 | 0.0624796 | 0.00813078 | 0.0912897 | -5.107065e-04 | 0.0001022361 | 5.82207e-06 | 0.000224031 |
| 16th Order Coefficient (G) | -0.0157586 | -0.0001138473 | 0.00047186 | 0.0771891 | -2.79363e-05 | -0.0118867 | 0.00047183 | -0.0037599 | 3.48033e-04 | -6.0450e-06 | -1.3828e-07 | -1.7698e-05 |
| 18th Order Coefficient (H) | 0 | 0 | 0 | 0 | 0 | 0 | 0 | 1.843e-05 | -1.08462e-07 | 1.4289e-07 | 1.3485e-09 | 3.6897e-07 |

| surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | -0.139748 | -11.253846 | -12.441001 | 4.146296 | -1.000001 | 8.349533 | 5.128711 | -28.226624 | 62.250376 | -18.764791 | -5.794828 | -0.862186 |
| 4th Order Coefficient (A) | 0.000733323 | 0.001802271 | -0.023703%6 | -0.069467 | -0.008073 | -0.110768 | -0.227255 | -0.134793 | 0.096145 | -0.011131% | -0.238048 | -0.353475 |
| 6th Order Coefficient (B) | 0.000972879 | 0.053512 | 0.126239 | 0.105925 | 0.046480 | 0.134144 | 0.458022 | 0.564116 | 0.102497 | -0.004716% | 0.0953693 | 0.134132 |
| 8th Order Coefficient (C) | -0.002800678 | -0.11849 | -0.134723 | -0.105213 | -0.0632073 | -0.183014 | -0.472863 | -0.633100 | 0.0971847 | -0.0054704 | -0.0092975 | -0.042752% |
| 10th Order Coefficient (D) | 0.020684 | 0.06743393 | -0.01242210 | 0.000117296 | 0.0274796 | 0.167025 | 0.131061 | 0.467488 | -0.00866711 | 0.000391198 | 0.00023296 | 0.0113249 |
| 12th Order Coefficient (E) | -0.002919226 | -0.0172956 | 0.107357 | 0.0935485 | -0.0064834% | -0.1102277 | -0.1111977 | -0.198748 | 0.001692%2 | -0.00081753 | -0.00017801 | -0.0009527 |
| 14th Order Coefficient (F) | -0.009942389 | 0.00020208 | -0.001163 | -0.083023 | 0.001807021 | 0.025731 | 0.0144603 | 0.0453171 | -0.000746858 | 6.23946E-05 | 8.1208E-06 | 0.000206086 |
| 16th Order Coefficient (G) | 0.003154412 | -4.753185-03 | 0.010933 | 0.00269416 | 2.86491E-05 | -0.0034626 | 0 | -0.00478095 | 2.861616-05 | -2.15783E-06 | -2.09536E-07 | -0.000011% |
| 18th Order Coefficient (H) | 0 | 0 | 0 | 0 | 0 | 0 | 0 | 0.00012271 | -7.02739E-07 | 6.42123E-08 | 2.54945E-09 | 2.88834E-07 |

FIG. 16

OPTICAL SYSTEM

CROSS-REFERENCE TO RELATED APPLICATION

This application is a Continuation Application of U.S. patent application Ser. No. 16/435,730, filed on Jun. 10, 2019, now U.S. Pat. No. 11,249,284, which is a Continuation Application of U.S. patent application Ser. No. 14/670,103 filed on Mar. 26, 2015, now U.S. Pat. No. 10,365,455, which claims the benefit under 35 USC 119(a) of Korean Patent Application No. 10-2014-0142082, filed on Oct. 20, 2014, with the Korean Intellectual Property Office, the entire disclosures of which are incorporated herein by reference for all purposes.

BACKGROUND

Some embodiments of the present disclosure may relate to an optical system.

Recently, mobile communications terminals have commonly been provided with camera modules, enabling image capturing and video calling. In addition, as levels of functionality of cameras in such mobile communications terminals have gradually increased, cameras for use in mobile communications terminals have gradually been required to have higher levels of resolution and performance.

However, since there is a trend for mobile communications terminals to be miniaturized and lightened, there are limitations in obtaining camera modules having high levels of resolution and high degrees of performance.

In order to resolve such issues, recently, camera lenses have been formed of plastic, a material lighter than glass, and lens modules have been configured of five or more lenses to achieve high degrees of resolution.

SUMMARY

An aspect of the present disclosure may provide an optical system in which an aberration improvement effect, a high degree of brightness, and/or a high degree of resolution may be implemented.

According to an aspect of the present disclosure, an optical system may include: a first lens having refractive power; a second lens having refractive power; a third lens having refractive power and comprising an image-side surface which is convex in a paraxial region; a fourth lens having refractive power; a fifth lens having refractive power and comprising an image-side surface which is concave in the paraxial region; a sixth lens having refractive power; and a stop disposed in front of an object-side surface of the first lens. The first to sixth lenses may be sequentially disposed from an object side to an image side. A radius of the stop SD and an overall focal length of the optical system f satisfy: $0.2<SD/f<0.6$, whereby an aberration improvement effect and high degrees of resolution and brightness may be obtained.

Other embodiments are also described. The above summary does not include an exhaustive list of all aspects of the present invention. It is contemplated that the invention includes all optical systems that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF DRAWINGS

The above and other aspects, features and advantages of the present disclosure will be more clearly understood from the following detailed description taken in conjunction with the accompanying drawings, in which:

FIG. 3 is a table showing characteristics of lenses in the optical system illustrated in FIG. 1;

FIG. 4 is a table showing aspherical surface coefficients of lenses in the optical system illustrated in FIG. 1;

FIG. 7 is a table showing characteristics of lenses in the optical system illustrated in FIG. 5;

FIG. 8 is a table showing aspherical surface coefficients of lenses in the optical system illustrated in FIG. 5;

FIG. 11 is a table showing characteristics of lenses in the optical system illustrated in FIG. 9;

FIG. 12 is a table showing aspherical surface coefficients of lenses in the optical system illustrated in FIG. 9;

FIG. 15 is a table showing characteristics of lenses in the optical system illustrated in FIG. 13;

FIG. 16 is a table showing aspherical surface coefficients of lenses in the optical system illustrated in FIG. 13.

DETAILED DESCRIPTION

Figure 1:
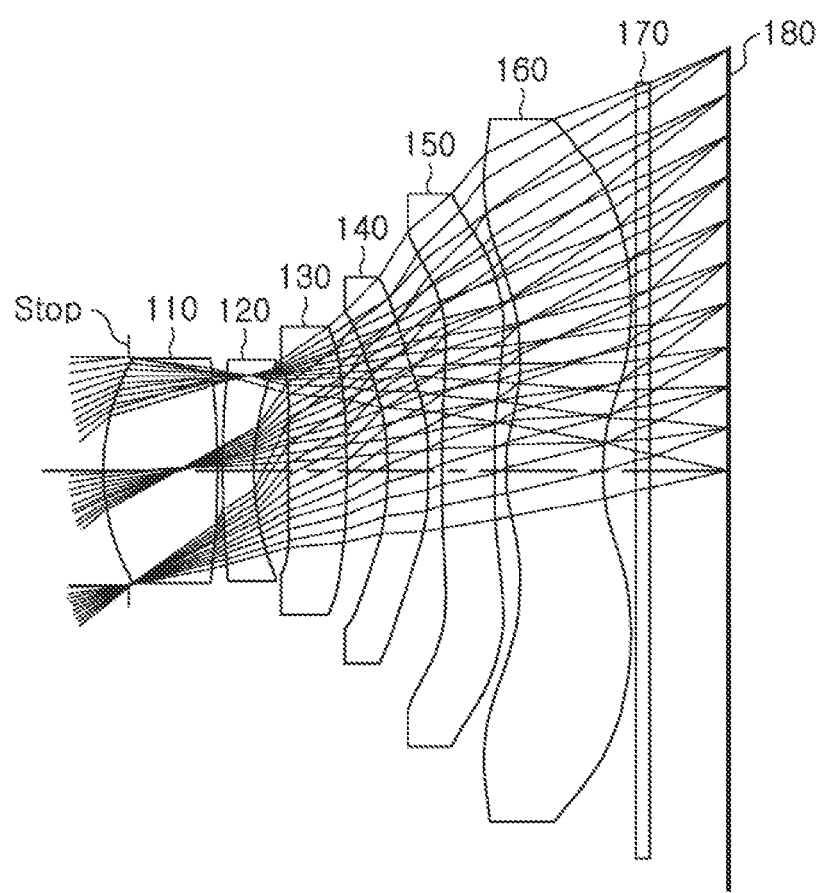
FIG. 1 is a schematic view of an optical system according to a first exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the drawings, the thicknesses, sizes, and shapes of lenses have been slightly exaggerated for convenience of explanation. Particularly, the shapes of spherical surfaces and aspherical surfaces are illustrated by way of example, but are not limited to those illustrated in the drawings.

In embodiments of the present specification, a first lens refers to a lens closest to an object, and a sixth lens refers to a lens closest to an image sensor.

In addition, a first surface of each lens refers to a surface thereof closer to or facing the object side (or an object-side surface) and a second surface of each lens refers to a surface thereof closer to or facing the image side (or an image-side surface). Further, unless otherwise indicated herein, in embodiments of the present disclosure, numerical values of radii of curvature, thicknesses, and the like, of lenses are represented by millimeters (mm). In addition, a paraxial region may refer to a very narrow region on an optical axis and/or in the vicinity of an optical axis.

An optical system according to exemplary embodiments may include six or more lenses.

For example, the optical system may include a first lens, a second lens, a third lens, a fourth lens, a fifth lens, and a sixth lens.

However, the optical system is not limited to including only six lenses, and may further include other components or additional one or more lenses, if necessary. For example, the optical system may include a stop for controlling an amount of light. In addition, the optical system may further include an infrared cut-off filter filtering infrared light. Additionally, the optical system may further include an image sensor converting an image of a subject incident on the image sensor into electrical signals. Further, the optical system may further include a gap maintaining member adjusting gaps between lenses.

At least one or more of the first to sixth lenses configuring the optical system according to exemplary embodiments may be formed of plastic. However, at least one or more of the first to sixth lenses may be formed of other materials, for example, but not limited to, glass.

In addition, at least one or more of the first to sixth lenses may have one or both aspherical surfaces. Further, each of the first to sixth lenses may have at least one or both aspherical surfaces.

For instance, at least one of first and second surfaces of the first to sixth lenses may be aspherical. Here, the aspherical surfaces of the first to sixth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 1]}$$

Here, c is a curvature (an inverse of a radius of curvature) at an apex of the lens, K is a conic constant, and Y is a distance from a certain point on the aspherical surface of the lens to an optical axis in a direction perpendicular to the optical axis. In addition, constants A to F are aspherical surface coefficients and, Z is a distance between the certain point on the aspherical surface at the distance Y and a tangential plane meeting the apex of the aspherical surface of the lens.

The optical system including the first to sixth lenses may have lenses having positive refractive power, negative refractive power, positive refractive power, positive or negative refractive power, negative refractive power, positive refractive power, sequentially from the object side.

The optical system configured as described above may, for example, but not limited to, improve optical performance through aberration improvement. In addition, in some embodiments of the optical system configured as described above, all of the six lenses may be formed of plastic.

The optical system according to exemplary embodiments may satisfy Conditional Expression 1.

$0.2 < SD/f < 0.6$ [Conditional Expression 1]

Here, SD is a radius of the stop, and f is an overall focal length of the optical system.

The optical system according to exemplary embodiments may satisfy Conditional Expression 2.

$1.1 < TTL/f < 1.35$ [Conditional Expression 2]

Here, TTL is a distance from an object-side surface of the first lens to an imaging surface of the image sensor, and f is the overall focal length of the optical system.

The optical system according to exemplary embodiments may satisfy Conditional Expression 3.

$1.0 < |r9|/f < 40$ [Conditional Expression 3]

Here, f is the overall focal length of the optical system, and r9 is a radius of curvature of an object-side surface of the fifth lens.

The optical system according to exemplary embodiments may satisfy Conditional Expression 4.

$|v5-v6| > 20$ [Conditional Expression 4]

Here, v5 is an Abbe number of the fifth lens, and v6 is an Abbe number of the sixth lens.

The optical system according to exemplary embodiments may satisfy Conditional Expression 5.

$v1-v2 > 20$ [Conditional Expression 5]

Here, v1 is an Abbe number of the first lens, and v2 is an Abbe number of the second lens.

The optical system according to exemplary embodiments may satisfy Conditional Expression 6.

$1.3 < f/f1 < 1.6$ [Conditional Expression 6]

Here, f is the overall focal length of the optical system, and f1 is a focal length of the first lens.

The optical system according to exemplary embodiments may satisfy Conditional Expression 7.

$0.1 < f/f3 < 0.3$ [Conditional Expression 7]

Here, f is the overall focal length of the optical system, and f3 is a focal length of the third lens.

The optical system according to exemplary embodiments may satisfy Conditional Expression 8.

$0.2 < |f/f5| < 0.4$ [Conditional Expression 8]

Here, f is the overall focal length of the optical system, and f5 is a focal length of the fifth lens.

The optical system according to exemplary embodiments may satisfy Conditional Expression 9.

$0 < f1/f3 < 0.2$ [Conditional Expression 9]

Here, f1 is the focal length of the first lens, and f3 is the focal length of the third lens.

The optical system according to exemplary embodiments may satisfy Conditional Expression 10.

$2 < |f/f1| + |f/f2| < 2.5$ [Conditional Expression 10]

Here, f is the overall focal length of the optical system, f1 is the focal length of the first lens, and f2 is a focal length of the second lens.

The optical system according to exemplary embodiments may satisfy Conditional Expression 11.

$0.1 < |f/f3| + |f/f4| < 0.4$ [Conditional Expression 11]

Here, f is the overall focal length of the optical system, f3 is the focal length of the third lens, and f4 is a focal length of the fourth lens.

The optical system according to exemplary embodiments may satisfy Conditional Expression 12.

$$0.3<|f/f5|+|f/f6|<0.6 \qquad \text{[Conditional Expression 12]}$$

Here, f is the overall focal length of the optical system, f5 is the focal length of the fifth lens, and f6 is a focal length of the sixth lens.

The optical system according to exemplary embodiments may satisfy Conditional Expression 13.

$$1.5<TTL/ImgH<1.7 \qquad \text{[Conditional Expression 13]}$$

Here, TTL is the distance from the object-side surface of the first lens to the imaging surface of the image sensor, and ImgH is a diagonal length of the imaging surface of the image sensor.

The optical system according to exemplary embodiments may satisfy Conditional Expression 14.

$$65<FOV<80 \qquad \text{[Conditional Expression 14]}$$

Here, FOV is a field of view of the optical system. Here, the FOV is represented by degrees.

The optical system according to exemplary embodiments may satisfy Conditional Expression 15.

$$SA2 \leq 30 \qquad \text{[Conditional Expression 15]}$$

Figure 17:
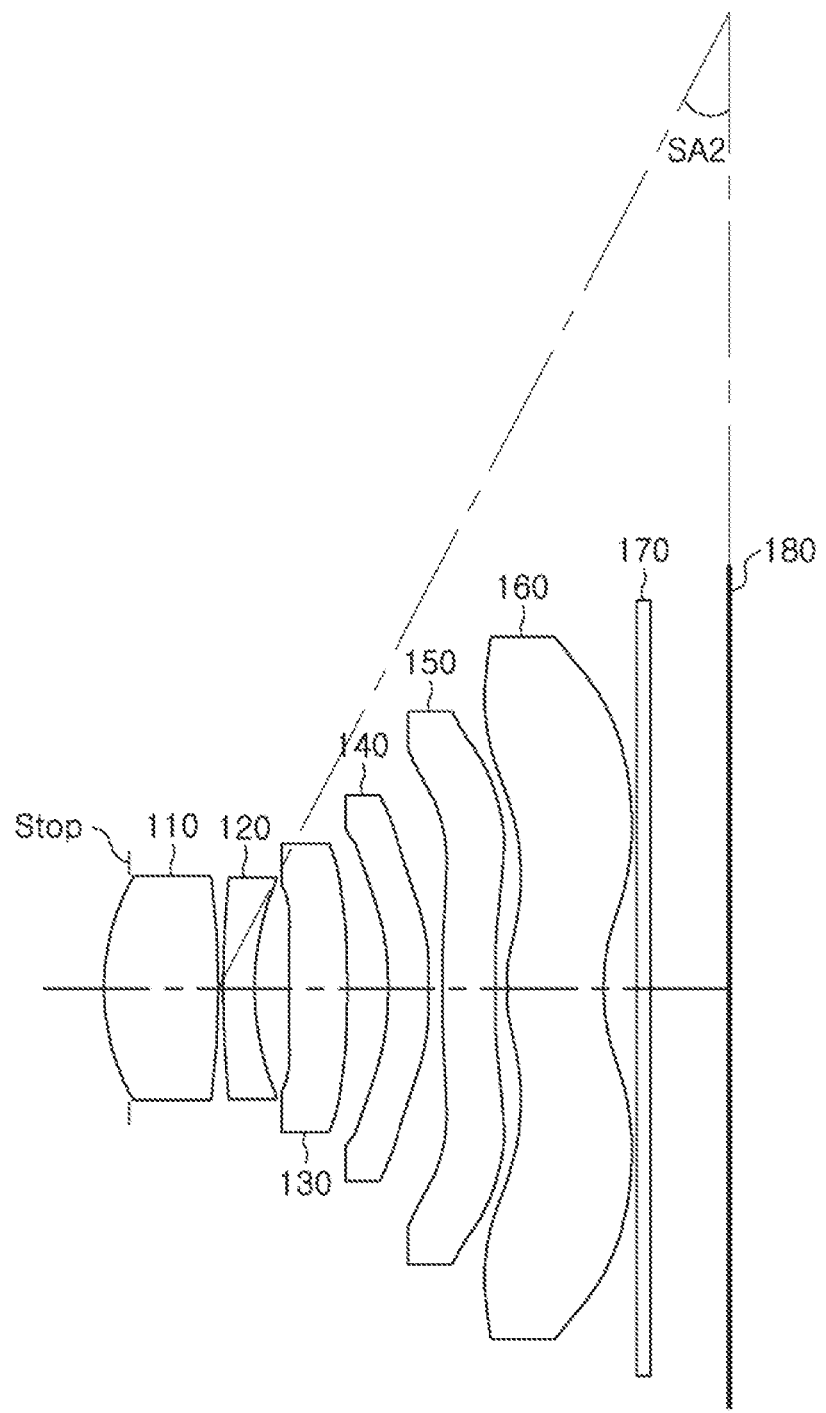
FIG. 17 is an exemplary view showing an angle between a tangent line passing through an edge of an effective portion of an image-side surface of a second lens and an imaging surface of an image sensor in the optical system illustrated in FIG. 1.

Here, SA2 is an angle between a tangent line passing through an edge of an effective diameter of an image-side surface of the second lens and the imaging surface of the image sensor (see FIG. 17). Here, the SA2 is represented by degrees.

Next, the first to sixth lenses configuring the optical system according to exemplary embodiments will be described.

The first lens may have positive refractive power. However, the first lens may have negative refractive power. In addition, both surfaces of the first lens may be convex. For instance, a first surface of the first lens may be convex toward the object in a paraxial region, and a second surface of the first lens may be convex toward the image sensor in the paraxial region. However, one or both of object-side and image-side surfaces of the first lens may be concave.

Alternatively, the first lens may have a meniscus shape which is convex toward the object. In detail, a first surface of the first lens may be convex toward the object in the paraxial region and a second surface of the first lens may be concave toward the image sensor in the paraxial region.

At least one of the first and second surfaces of the first lens may be aspherical. For example, both surfaces of the first lens may be aspherical.

The second lens may have negative refractive power. However, the second lens may have positive refractive power. In addition, the second lens may have a meniscus shape which is convex toward the object. For example, a first surface of the second lens may be convex toward the object in the paraxial region and a second surface of the second lens may be concave toward the image sensor in the paraxial region. However, the object-side surface of the second lens may be concave and/or the image-side surface of the second lens may be convex.

At least one of the first and second surfaces of the second lens may be aspherical. For example, both surfaces of the second lens may be aspherical.

The third lens may have positive refractive power. However, the third lens may have negative refractive power. In addition, the third lens may have a meniscus shape which is convex toward the image sensor. For instance, a first surface of the third lens may be concave toward the object in the paraxial region and a second surface of the third lens may be convex toward the image sensor in the paraxial region. However, the object-side surface of the third lens may be convex and/or the image-side surface of the second lens may be concave.

Alternatively, both surfaces of the third lens may be convex. For example, a first surface of the third lens may be convex toward the object in the paraxial region, and a second surface of the third lens may be convex toward the image sensor in the paraxial region.

At least one of the first and second surfaces of the third lens may be aspherical. For example, both surfaces of the third lens may be aspherical.

The fourth lens may have positive or negative refractive power. In addition, the fourth lens may have a meniscus shape which is convex toward the image sensor. In detail, a first surface of the fourth lens may be concave toward the object in the paraxial region and a second surface of the fourth lens may be convex toward the image sensor in the paraxial region. However, the object-side surface of the fourth lens may be convex and/or the image-side surface of the fourth lens may be concave.

At least one of the first and second surfaces of the fourth lens may be aspherical. For example, both surfaces of the fourth lens may be aspherical.

The fifth lens may have negative refractive power. However, the fifth lens may have positive refractive power. In addition, both surfaces of the fifth lens may be concave. For instance, a first surface of the fifth lens may be concave toward the object in the paraxial region, and a second surface of the fifth lens may be concave toward the image sensor in the paraxial region. However, one or both of object-side and image-side surfaces of the fifth lens may be convex.

Alternatively, the fifth lens may have a meniscus shape which is convex toward the object. In detail, a first surface of the fifth lens may be convex toward the object in the paraxial region and a second surface of the fifth lens may be concave toward the image sensor in the paraxial region. However, the object-side surface of the fifth lens may be concave and/or the image-side surface of the fifth lens may be convex.

At least one of the first and second surfaces of the fifth lens may be aspherical. For example, both surfaces of the fifth lens may be aspherical.

In addition, at least one or more inflection points may be formed on at least one or both of the first and second surfaces of the fifth lens. For example, the second surface of the fifth lens may be concave in the paraxial region and become convex at an edge thereof.

The sixth lens may have positive refractive power. However, the sixth lens may have negative refractive power. In addition, the sixth lens may have a meniscus shape which is convex toward the object. For instance, a first surface of the sixth lens may be convex toward the object in the paraxial region and a second surface of the sixth lens may be concave toward the image sensor in the paraxial region. However, the object-side surface of the sixth lens may be concave and/or the image-side surface of the sixth lens may be convex.

At least one of the first and second surfaces of the sixth lens may be aspherical. For example, both surfaces of the sixth lens may be aspherical.

In addition, at least one or more inflection points may be formed on at least one or both of the first and second surfaces of the sixth lens. For example, the second surface of the sixth lens may be concave in the paraxial region and become convex at an edge thereof.

In the optical system configured as described above, a plurality of lenses may perform an aberration correction function improving aberration performance.

An optical system according to a first exemplary embodiment in the present disclosure will be described with reference to FIGS. 1 through 4.

The optical system according to the first exemplary embodiment may include a first lens 110, a second lens 120, a third lens 130, a fourth lens 140, a fifth lens 150, and a sixth lens 160, and may further include a stop, an infrared cut-off filter 170, and an image sensor 180.

As illustrated in Table 1 (shown below), a focal length (f1) of the first lens 110 may be 2.85 mm, a focal length (f2) of the second lens 120 may be −5.3 mm, a focal length (f3) of the third lens 130 may be 28.86 mm, a focal length (f4) of the fourth lens 140 may be 741.25 mm, a focal length (f5) of the fifth lens 150 may be −12.35 mm, a focal length (f6) of the sixth lens 160 may be 32.76 mm, and an overall focal length (f) of the optical system may be 4.16 mm.

TABLE 1

| | |
|---|---|
| FOV | 68 |
| Fno | 2.2 |
| TTL | 5.7 |
| f | 4.16 |
| f1 | 2.85 |
| f2 | −5.3 |
| f3 | 28.86 |
| f4 | 741.25 |
| f5 | −12.35 |
| f6 | 32.76 |
| SD/f | 0.22 |
| TTL/f | 1.36 |
| |r9|/f | 26 |
| |v5 − v6| | 35 |
| v1 − v2 | 35 |

Here, respective characteristics (radii of curvature, thicknesses, refractive indices, and Abbe numbers) of the lenses 110 to 160 are illustrated in the table of FIG. 3.

In the first exemplary embodiment, the first lens 110 may have positive refractive power and both surfaces of the first lens 110 may be convex. For example, a first surface of the first lens 110 may be convex toward an object in the paraxial region, and a second surface of the first lens 110 may be convex toward the image sensor in the paraxial region. However, alternatively, the first lens 110 may have negative refractive power, and/or at least one of object-side and image-side surfaces of the first lens 110 may be concave.

The second lens 120 may have negative refractive power. In addition, the second lens 120 may have a meniscus shape which is convex toward the object. For example, a first surface of the second lens 120 may be convex toward the object in the paraxial region and a second surface of the second lens 120 may be concave toward the image sensor in the paraxial region. However, alternatively, the second lens 120 may have positive refractive power, the object-side surface of the second lens 120 may be concave, and/or the image-side surface of the second lens 120 may be convex.

The third lens 130 may have positive refractive power. In addition, the third lens 130 may have a meniscus shape which is convex toward the image sensor. For example, a first surface of the third lens 130 may be concave toward the object in the paraxial region and a second surface of the third lens 130 may be convex toward the image sensor in the paraxial region. However, alternatively, the third lens 130 may have negative refractive power, the object-side surface of the third lens 130 may be convex, and/or the image-side surface of the third lens 130 may be concave.

The fourth lens 140 may have positive refractive power. In addition, the fourth lens 140 may have a meniscus shape which is convex toward the image sensor. For example, a first surface of the fourth lens 140 may be concave toward the object in the paraxial region and a second surface of the fourth lens 140 may be convex toward the image sensor in the paraxial region. However, alternatively, the fourth lens 140 may have negative refractive power, the object-side surface of the fourth lens 140 may be convex, and/or the image-side surface of the fourth lens 140 may be concave.

The fifth lens 150 may have negative refractive power and both surfaces of the fifth lens 150 may be concave. For example, a first surface of the fifth lens 150 may be concave toward the object in the paraxial region, and a second surface of the fifth lens 150 may be concave toward the image sensor in the paraxial region. In addition, at least one inflection point may be formed on at least one of the first and second surfaces of the fifth lens 150. However, alternatively, the fifth lens 150 may have positive refractive power, and/or at least one of object-side and image-side surfaces of the fifth lens 150 may be convex.

The sixth lens 160 may have positive refractive power. In addition, the sixth lens 160 may have a meniscus shape which is convex toward the object. For example, a first surface of the sixth lens 160 may be convex toward the object in the paraxial region and a second surface of the sixth lens 160 may be concave toward the image sensor in the paraxial region. However, alternatively, the sixth lens 160 may have negative refractive power, the object-side surface of the sixth lens 160 may be concave, and/or the image-side surface of the sixth lens 160 may be convex. In addition, at least one or more inflection points may be formed on at least one or both of the first and second surfaces of the sixth lens 160.

Meanwhile, the respective surfaces of the first to sixth lenses 110 to 160 may have aspherical coefficients as illustrated in the table of FIG. 4.

In addition, the stop may be disposed in front of an object-side surface of the first lens 110. However, alternatively, the stop may be disposed anywhere between the first lens 110 and the sixth lens 160.

Figure 2:
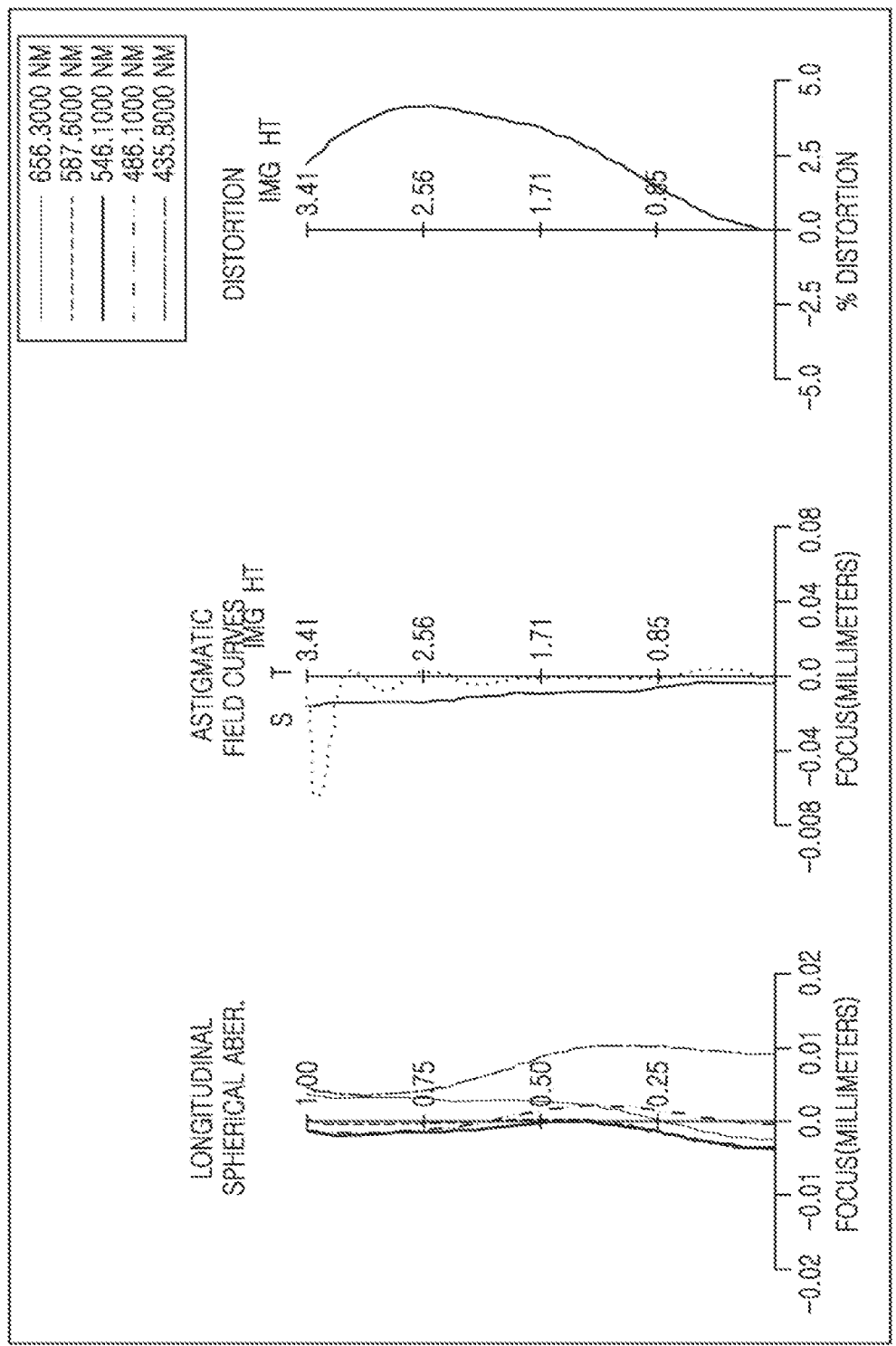
FIG. 2 is graphs having curves representing aberration characteristics of the optical system illustrated in FIG. 1.
Figure 5:
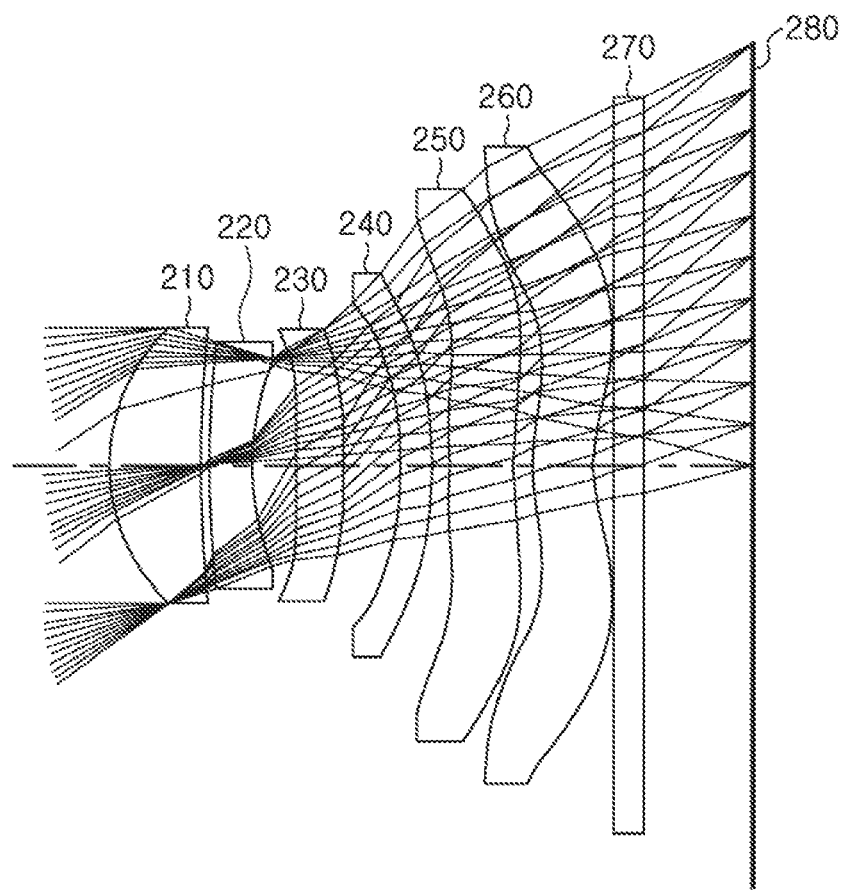
FIG. 5 is a schematic view of an optical system according to a second exemplary embodiment in the present disclosure.

In addition, the optical system configured as described above may have aberration characteristics illustrated in FIG. 2.

An optical system according to a second exemplary embodiment in the present disclosure will be described with reference to FIGS. 5 through 8.

The optical system according to the second exemplary embodiment may include a first lens 210, a second lens 220, a third lens 230, a fourth lens 240, a fifth lens 250, and a sixth lens 260, and may further include a stop, an infrared cut-off filter 270, and an image sensor 280.

As illustrated in Table 2 (shown below), a focal length (f1) of the first lens 210 may be 3.42 mm, a focal length (f2) of the second lens 220 may be −7.24 mm, a focal length (f3) of the third lens 230 may be 33.42 mm, a focal length (f4) of the fourth lens 240 may be 64.65 mm, a focal length (f5) of the fifth lens 250 may be −12.94 mm, a focal length (f6) of the sixth lens 260 may be 1380 mm, and an overall focal length (f) of the optical system may be 4.71 mm.

TABLE 2

| | |
|---|---|
| FOV | 70 |
| Fno | 2.2 |
| TTL | 5.3 |
| f | 4.71 |
| f1 | 3.42 |
| f2 | −7.24 |
| f3 | 33.42 |
| f4 | 64.65 |
| f5 | −12.94 |
| f6 | 1380 |
| SD/f | 0.51 |
| TTL/f | 1.13 |
| |r9|/f | 17 |
| |v5 − v6| | 35 |
| v1 − v2 | 35 |

Here, respective characteristics (radii of curvature, thicknesses, refractive indices, and Abbe numbers) of the lenses 210 to 260 are illustrated in the table of FIG. 7.

In the second exemplary embodiment, the first lens 210 may have positive refractive power. In addition, the first lens 210 may have a meniscus shape which is convex toward the object. For example, a first surface of the first lens 210 may be convex toward the object in the paraxial region and a second surface of the first lens 210 may be concave toward the image sensor in the paraxial region. However, alternatively, the first lens 210 may have negative refractive power, the object-side surface of the first lens 210 may be concave, and/or the image-side surface of the first lens 210 may be convex.

The second lens 220 may have negative refractive power. In addition, the second lens 220 may have a meniscus shape which is convex toward the object. For example, a first surface of the second lens 220 may be convex toward the object in the paraxial region and a second surface of the second lens 220 may be concave toward the image sensor in the paraxial region. However, alternatively, the second lens 220 may have positive refractive power, the object-side surface of the second lens 220 may be concave, and/or the image-side surface of the second lens 220 may be convex.

The third lens 230 may have positive refractive power and both surfaces of the third lens 230 may be convex. For example, a first surface of the third lens 230 may be convex toward the object in the paraxial region, and a second surface of the third lens 230 may be convex toward the image sensor in the paraxial region. However, alternatively, the third lens 230 may have negative refractive power, and/or at least one of the object-side and image-side surfaces of the third lens 230 may be concave.

The fourth lens 240 may have positive refractive power. In addition, the fourth lens 240 may have a meniscus shape which is convex toward the image sensor. For example, a first surface of the fourth lens 240 may be concave toward the object in the paraxial region and a second surface of the fourth lens 240 may be convex toward the image sensor in the paraxial region. However, alternatively, the fourth lens 240 may have negative refractive power, the object-side surface of the fourth lens 240 may be convex, and/or the image-side surface of the fourth lens 240 may be concave.

The fifth lens 250 may have negative refractive power. In addition, the fifth lens 250 may have a meniscus shape which is convex toward the object. For example, a first surface of the fifth lens 250 may be convex toward the object in the paraxial region and a second surface of the fifth lens 250 may be concave toward the image sensor in the paraxial region. However, alternatively, the fifth lens 250 may have positive refractive power, the object-side surface of the fifth lens 250 may be concave, and/or the image-side surface of the fifth lens 250 may be convex. In addition, at least one or more inflection points may be formed on at least one or both of the first and second surfaces of the fifth lens 250.

The sixth lens 260 may have negative refractive power. In addition, the sixth lens 260 may have a meniscus shape which is convex toward the object. For example, a first surface of the sixth lens 260 may be convex toward the object in the paraxial region and a second surface of the sixth lens 260 may be concave toward the image sensor in the paraxial region. However, alternatively, the sixth lens 260 may have positive refractive power, the object-side surface of the sixth lens 260 may be concave, and/or the image-side surface of the sixth lens 260 may be convex. In addition, at least one or more inflection points may be formed on at least one or both of the first and second surfaces of the sixth lens 260.

Figure 8:
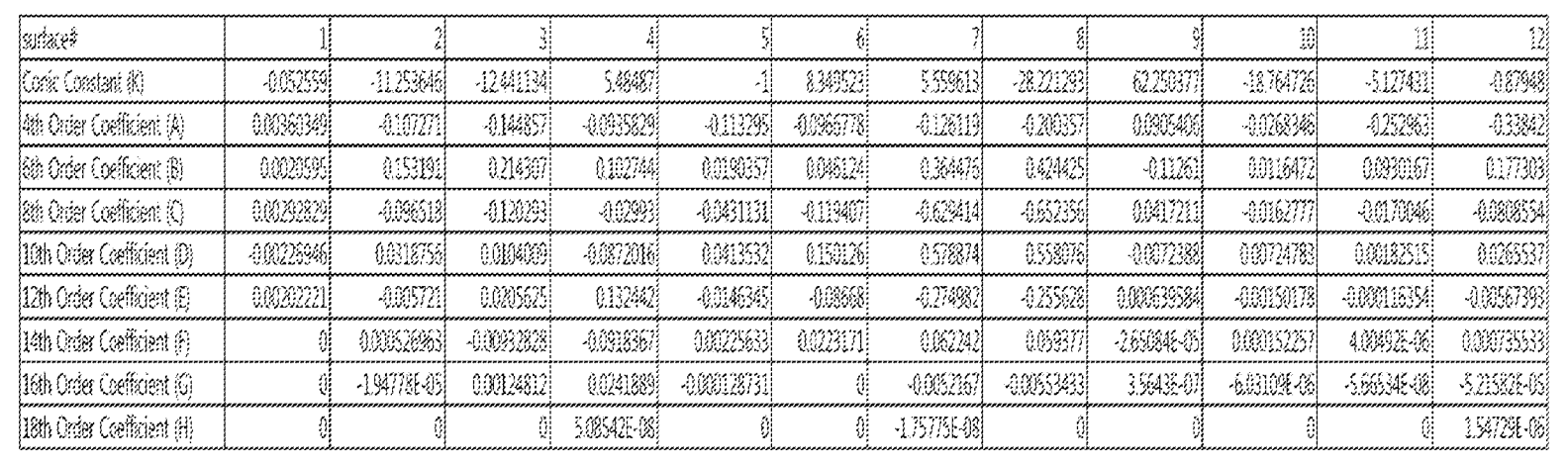

Meanwhile, the respective surfaces of the first to sixth lenses 210 to 260 may have aspherical coefficients as illustrated in the table of FIG. 8.

In addition, the stop may be disposed in front of an object-side surface of the first lens 210. However, alternatively, the stop may be disposed anywhere between the first lens 210 and the sixth lens 260.

Figure 6:
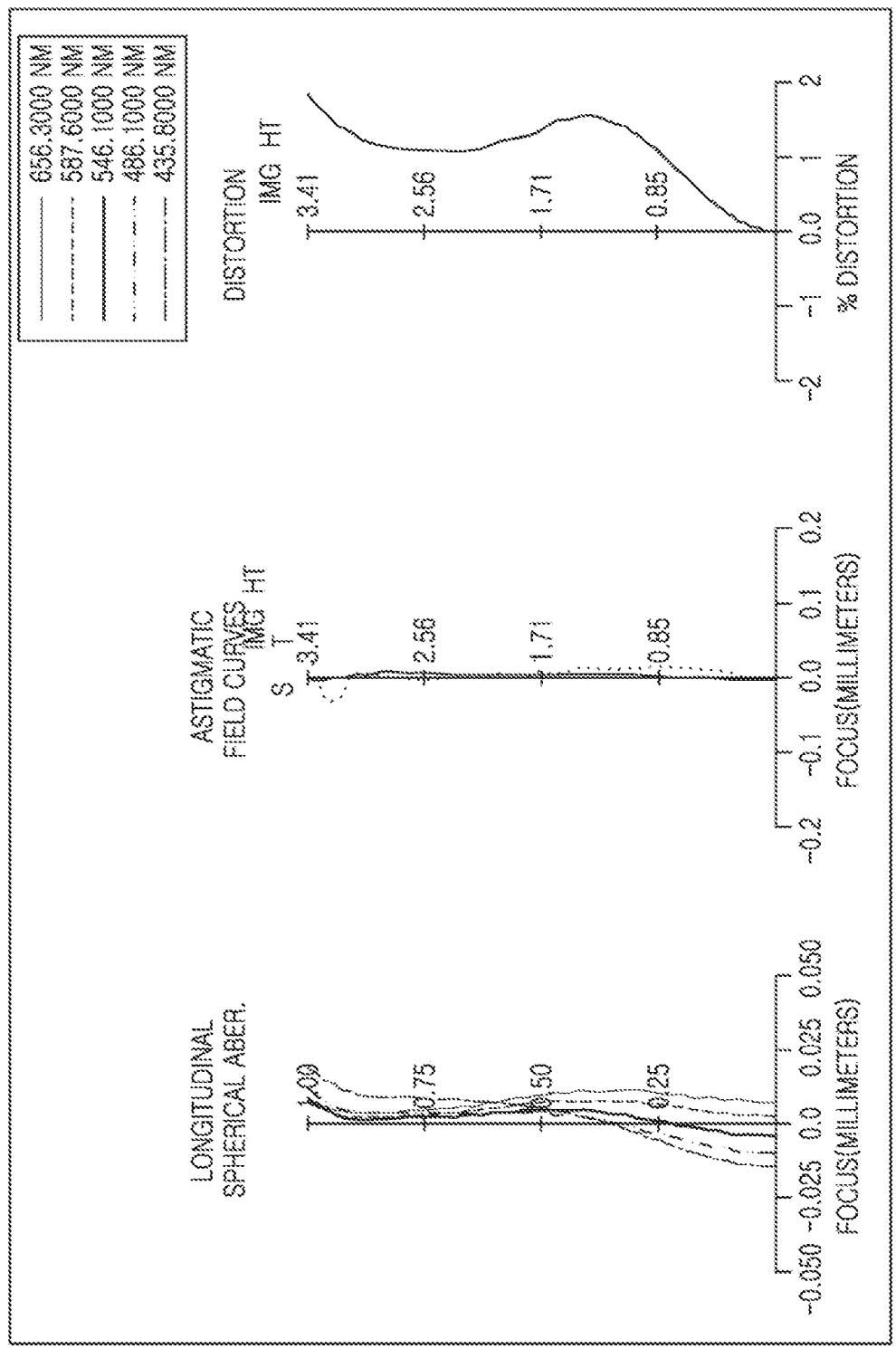
FIG. 6 is graphs having curves representing aberration characteristics of the optical system illustrated in FIG. 5.
Figure 9:
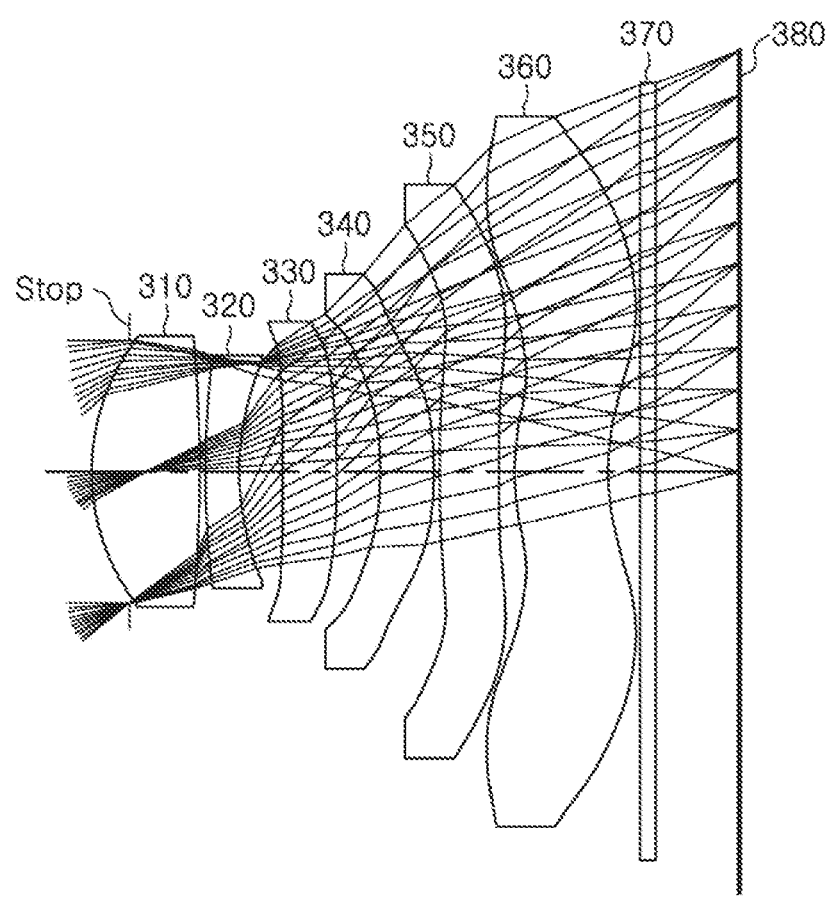
FIG. 9 is a schematic view of an optical system according to a third exemplary embodiment in the present disclosure.

In addition, the optical system configured as described above may have aberration characteristics illustrated in FIG. 6.

An optical system according to a third exemplary embodiment in the present disclosure will be described with reference to FIGS. 9 through 12.

The optical system according to the third exemplary embodiment may include a first lens 310, a second lens 320, a third lens 330, a fourth lens 340, a fifth lens 350, and a sixth lens 360, and may further include a stop, an infrared cut-off filter 370, and an image sensor 380.

As illustrated in Table 3 (shown below), a focal length (f1) of the first lens 310 may be 3.16 mm, a focal length (f2) of the second lens 320 may be −5.71 mm, a focal length (f3) of the third lens 330 may be 19.16 mm, a focal length (f4) of the fourth lens 340 may be 39 mm, a focal length (f5) of the fifth lens 350 may be −15 mm, a focal length (f6) of the sixth lens 360 may be 84 mm, and an overall focal length (f) of the optical system may be 4.2 mm.

TABLE 3

| | |
|---|---|
| FOV | 75 |
| Fno | 1.9 |
| TTL | 5.3 |
| f | 4.2 |
| f1 | 3.16 |
| f2 | −5.71 |
| f3 | 19.16 |
| f4 | 39 |
| f5 | −15 |
| f6 | 84 |
| SD/f | 0.55 |
| TTL/f | 1.26 |
| |r9|/f | 35 |
| |v5 − v6| | 35 |
| v1 − v2 | 35 |

Here, respective characteristics (radii of curvature, thicknesses, refractive indices, and Abbe numbers) of the lenses 310 to 360 are illustrated in the table of FIG. 11.

In the third exemplary embodiment, the first lens 310 may have positive refractive power and both surfaces of the first lens 310 may be convex. For example, a first surface of the first lens 310 may be convex toward the object in the paraxial region, and a second surface of the first lens 310 may be convex toward the image sensor in the paraxial region. However, alternatively, the first lens 310 may have negative refractive power, and/or at least one of the object-side and image-side surfaces of the first lens 310 may be concave.

The second lens 320 may have negative refractive power. In addition, the second lens 320 may have a meniscus shape which is convex toward the object. For example, a first surface of the second lens 320 may be convex toward the object in the paraxial region and a second surface of the second lens 320 may be concave toward the image sensor in the paraxial region. However, alternatively, the second lens 320 may have positive refractive power, the object-side surface of the second lens 320 may be concave, and/or the image-side surface of the second lens 320 may be convex.

The third lens 130 may have positive refractive power and both surfaces of the third lens 130 may be convex. For example, a first surface of the third lens 330 may be convex toward the object in the paraxial region, and a second surface of the third lens 330 may be convex toward the image sensor in the paraxial region. However, alternatively, the third lens 130 may have negative refractive power, and/or at least one of the object-side and image-side surfaces of the third lens 130 may be concave.

The fourth lens 340 may have positive refractive power. In addition, the fourth lens 340 may have a meniscus shape which is convex toward the image sensor. For example, a first surface of the fourth lens 340 may be concave toward the object in the paraxial region and a second surface of the fourth lens 340 may be convex toward the image sensor in the paraxial region. However, alternatively, the fourth lens 340 may have negative refractive power, the object-side surface of the fourth lens 340 may be convex, and/or the image-side surface of the fourth lens 340 may be concave.

The fifth lens 350 may have negative refractive power and both surfaces of the fifth lens 350 may be concave. For example, a first surface of the fifth lens 350 may be concave toward the object in the paraxial region, and a second surface of the fifth lens 350 may be concave toward the image sensor in the paraxial region. However, alternatively, the fifth lens 350 may have positive refractive power, and/or at least one of the object-side and image-side surfaces of the fifth lens 350 may be convex. In addition, at least one or more inflection points may be formed on at least one or both of the first and second surfaces of the fifth lens 350.

The sixth lens 360 may have positive refractive power. In addition, the sixth lens 360 may have a meniscus shape which is convex toward the object. For example, a first surface of the sixth lens 360 may be convex toward the object in the paraxial region and a second surface of the sixth lens 360 may be concave toward the image sensor in the paraxial region. However, alternatively, the sixth lens 360 may have negative refractive power, the object-side surface of the sixth lens 360 may be concave, and/or the image-side surface of the sixth lens 360 may be convex. In addition, at least one or more inflection points may be formed on at least one or both of the first and second surfaces of the sixth lens 360.

Meanwhile, the respective surfaces of the first to sixth lenses 310 to 360 may have aspherical coefficients as illustrated in the table of FIG. 12.

In addition, the stop may be disposed in front of an object-side surface of the first lens 310. However, alternatively, the stop may be disposed anywhere between the first lens 310 and the sixth lens 360.

Figure 10:
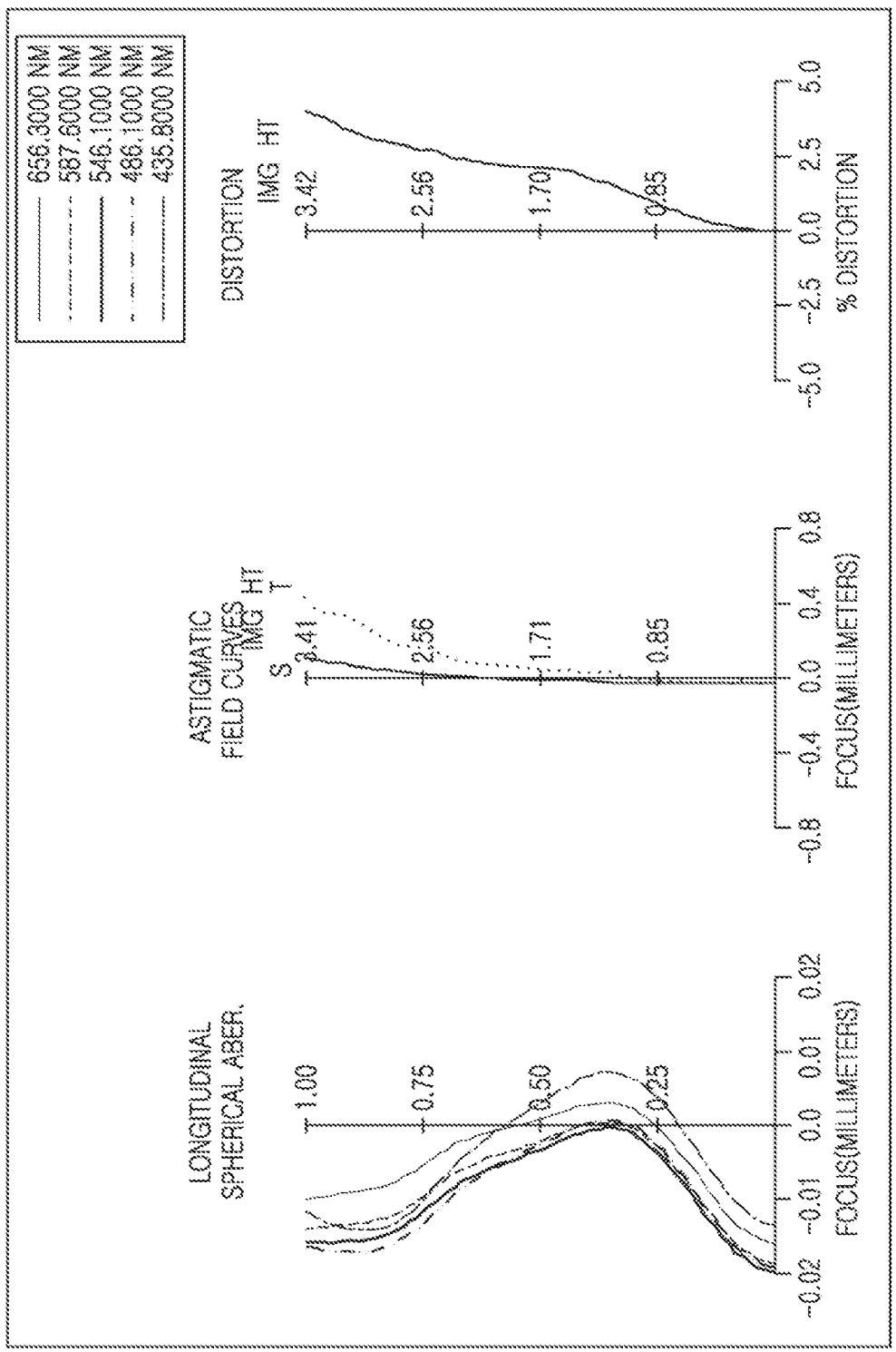
FIG. 10 is graphs having curves representing aberration characteristics of the optical system illustrated in FIG. 9.
Figure 13:
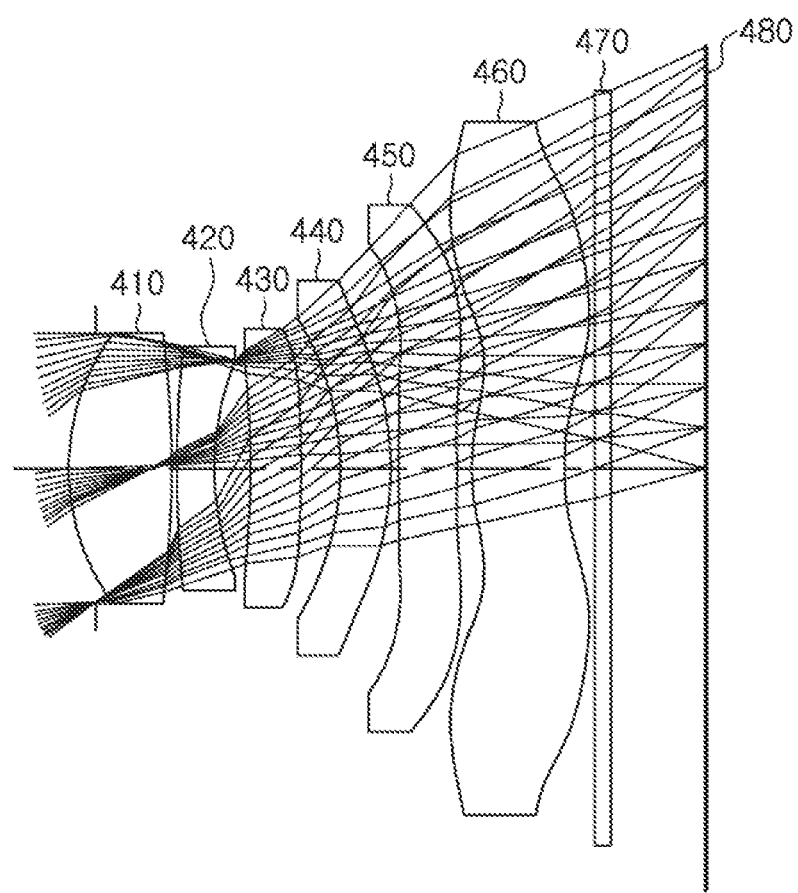
FIG. 13 is a schematic view of an optical system according to a fourth exemplary embodiment in the present disclosure.

In addition, the optical system configured as described above may have aberration characteristics illustrated in FIG. 10.

An optical system according to a fourth exemplary embodiment in the present disclosure will be described with reference to FIGS. 13 through 16.

The optical system according to the fourth exemplary embodiment may include a first lens 410, a second lens 420, a third lens 430, a fourth lens 440, a fifth lens 450, and a sixth lens 460, and may further include a stop, an infrared cut-off filter 470, and an image sensor 480.

As illustrated in Table 4 (shown below), a focal length (f1) of the first lens 410 may be 2.88 mm, a focal length (f2) of the second lens 420 may be −4.95 mm, a focal length (f3) of the third lens 430 may be 20.7 mm, a focal length (f4) of the fourth lens 440 may be −74.3 mm, a focal length (f5) of the fifth lens 450 may be −12.4 mm, a focal length (f6) of the sixth lens 460 may be 25.66 mm, and an overall focal length (f) of the optical system may be 4.4 mm.

TABLE 4

| | |
|---|---|
| FOV | 75 |
| Fno | 1.9 |
| TTL | 5.3 |
| f | 4.4 |
| f1 | 2.88 |
| f2 | −4.95 |
| f3 | 20.7 |
| f4 | −74.3 |
| f5 | −12.4 |
| f6 | 25.66 |
| SD/f | 0.58 |
| TTL/f | 1.2 |
| \|r9\|/f | 35 |
| \|v5 − v6\| | 35 |
| v1 − v2 | 35 |

Figure 15:
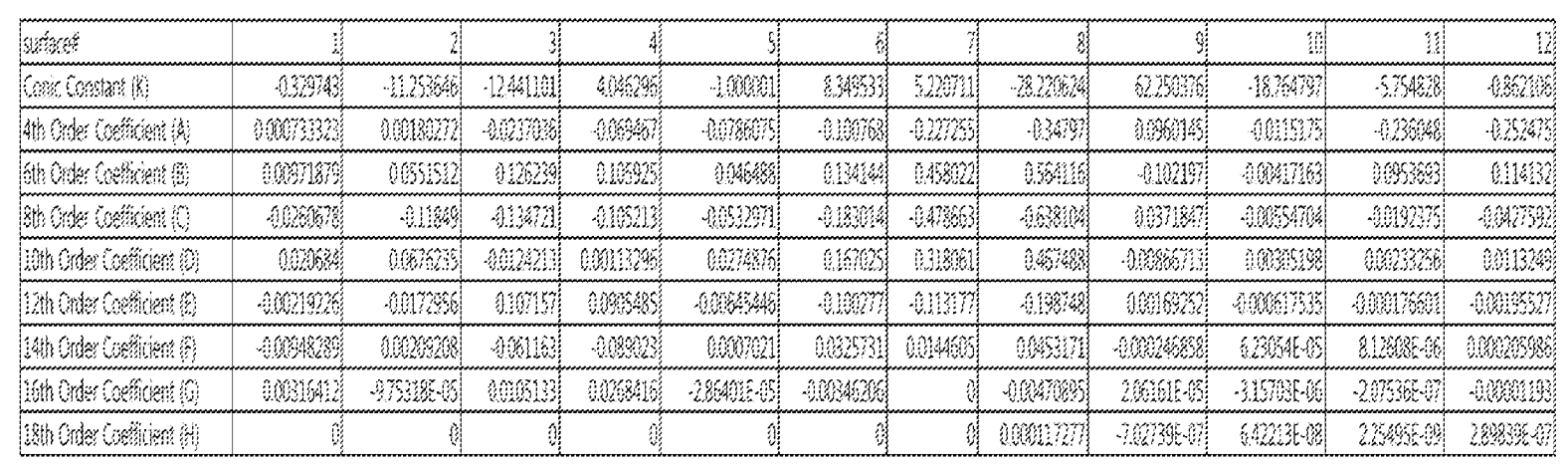

Here, respective characteristics (radii of curvature, thicknesses, refractive indices, and Abbe numbers) of the lenses 410 to 460 are illustrated in the table of FIG. 15.

In the fourth exemplary embodiment, the first lens 410 may have positive refractive power and both surfaces of the first lens 410 may be convex. For example, a first surface of the first lens 410 may be convex toward the object in the paraxial region, and a second surface of the first lens 410 may be convex toward the image sensor in the paraxial region. However, alternatively, the first lens 410 may have negative refractive power, and/or at least one of the object-side and image-side surfaces of the first lens 410 may be concave.

The second lens 420 may have negative refractive power. In addition, the second lens 420 may have a meniscus shape which is convex toward the object. For example, a first surface of the second lens 420 may be convex toward the object in the paraxial region and a second surface of the second lens 420 may be concave toward the image sensor in the paraxial region. However, alternatively, the second lens 420 may have positive refractive power, the object-side surface of the second lens 420 may be concave, and/or the image-side surface of the second lens 420 may be convex.

The third lens 430 may have positive refractive power. In addition, the third lens 430 may have a meniscus shape which is convex toward the image sensor. For example, a first surface of the third lens 430 may be concave toward the object in the paraxial region and a second surface of the third lens 430 may be convex toward the image sensor in the paraxial region. However, alternatively, the third lens 430 may have negative refractive power, the object-side surface of the third lens 430 may be convex, and/or the image-side surface of the third lens 430 may be concave.

The fourth lens 440 may have negative refractive power. In addition, the fourth lens 440 may have a meniscus shape which is convex toward the image sensor. For example, a first surface of the fourth lens 440 may be concave toward the object in the paraxial region and a second surface of the fourth lens 440 may be convex toward the image sensor in the paraxial region. However, alternatively, the fourth lens 440 may have positive refractive power, the object-side surface of the fourth lens 440 may be convex, and/or the image-side surface of the fourth lens 440 may be concave.

The fifth lens 450 may have negative refractive power and both surfaces of the fifth lens 450 may be concave. For example, a first surface of the fifth lens 450 may be concave toward the object in the paraxial region, and a second surface of the fifth lens 450 may be concave toward the image sensor in the paraxial region. However, alternatively, the fifth lens 450 may have positive refractive power, and/or at least one of the object-side and image-side surfaces of the fifth lens 450 may be convex. In addition, at least one or more inflection points may be formed on at least one or both of the first and second surfaces of the fifth lens 450.

The sixth lens 460 may have positive refractive power. In addition, the sixth lens 460 may have a meniscus shape which is convex toward the object. For example, a first surface of the sixth lens 460 may be convex toward the object in the paraxial region and a second surface of the sixth lens 460 may be concave toward the image sensor in the paraxial region. However, alternatively, the sixth lens 460 may have negative refractive power, the object-side surface of the sixth lens 460 may be concave, and/or the image-side surface of the sixth lens 460 may be convex. In addition, at least one or more inflection points may be formed on at least one or both of the first and second surfaces of the sixth lens 460.

Meanwhile, the respective surfaces of the first to sixth lenses 410 to 460 may have aspherical coefficients as illustrated in the table of FIG. 16.

In addition, the stop may be disposed in front of an object-side surface of the first lens 410. However, alternatively, the stop may be disposed anywhere between the first lens 410 and the sixth lens 460.

Figure 14:
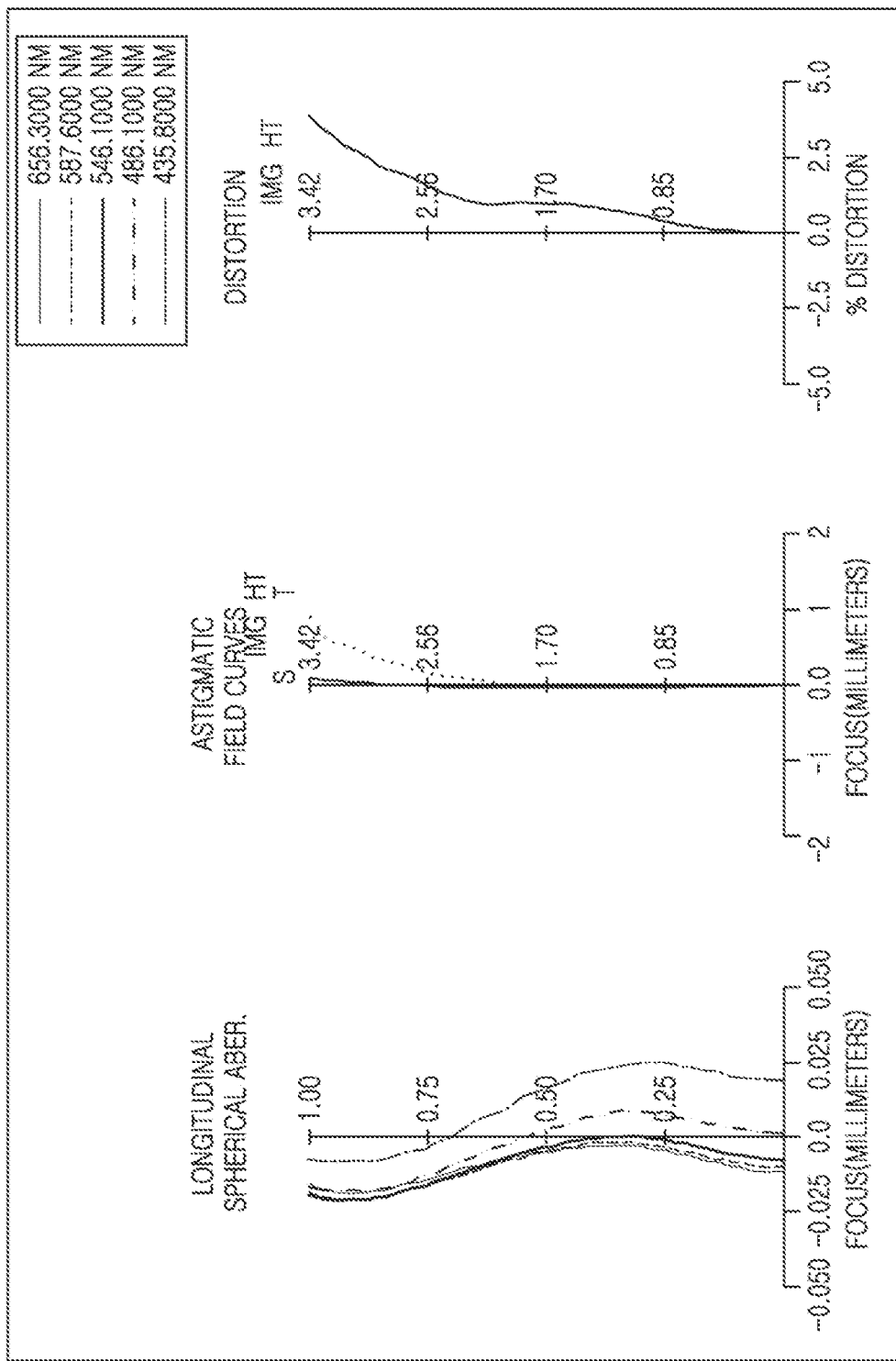
FIG. 14 is graphs having curves representing aberration characteristics of the optical system illustrated in FIG. 13.

In addition, the optical system configured as described above may have aberration characteristics illustrated in FIG. 14.

As set forth above, in the optical system according to some exemplary embodiments of the present disclosure, for example, an aberration improvement effect and high degrees of brightness and resolution may be obtained.

While exemplary embodiments have been shown and described above, it will be apparent to those skilled in the art that modifications and variations could be made without departing from the scope of the present invention as defined by the appended claims.

What is claimed is:

1. An optical system comprising:
   a first lens having positive refractive power, a convex object-side surface, and a convex image-side surface;
   a second lens having negative refractive power, a convex object-side surface, and a concave image-side surface;
   a third lens having refractive power;
   a fourth lens having negative refractive power;
   a fifth lens having negative refractive power, and a concave image-side surface; and
   a sixth lens having positive refractive power,
   wherein the first to sixth lenses are sequentially disposed from an object side.

2. The optical system of claim 1, wherein v1-v2>20 is satisfied, where v1 is an Abbe number of the first lens, and v2 is an Abbe number of the second lens.

3. The optical system of claim 1, wherein |v5-v6|>20 is satisfied, where v5 is an Abbe number of the fifth lens, and v6 is an Abbe number of the sixth lens.

4. The optical system of claim 1, wherein the first lens has a convex object-side surface.

5. The optical system of claim 4, wherein the first lens has a convex image-side surface.

6. The optical system of claim 1, wherein the second lens has a convex object-side surface.

7. The optical system of claim 6, wherein the second lens has a concave image-side surface.

8. The optical system of claim 1, wherein the sixth lens has a convex object-side surface.

9. The optical system of claim 1, wherein the first to sixth lenses are formed of plastic.

10. The optical system of claim 1, wherein at least one or more inflection points are formed on at least one or both of an object-side surface and an image-side surface of the fifth lens.

11. The optical system of claim 1, wherein at least one or more inflection points on at least one or both of an object-side surface and an image-side surface of the sixth lens.

12. The optical system of claim 1, wherein at least one or both of an object-side surface and an image-side surface of each of the first to sixth lenses is aspherical.

* * * * *